(12) United States Patent
Kato

(10) Patent No.: US 8,845,257 B2
(45) Date of Patent: Sep. 30, 2014

(54) FASTENER

(71) Applicant: Newfrey LLC, Newark, DE (US)

(72) Inventor: Hiroyuki Kato, Toyohashi (JP)

(73) Assignee: Newfrey LLC, Newark, DE (US)

( * ) Notice: Subject to any disclaimer, the term of this patent is extended or adjusted under 35 U.S.C. 154(b) by 7 days.

(21) Appl. No.: 13/743,622

(22) Filed: Jan. 17, 2013

(65) Prior Publication Data

US 2013/0189048 A1    Jul. 25, 2013

(30) Foreign Application Priority Data

Jan. 20, 2012 (JP) ................................ 2012-010139

(51) Int. Cl.
| | | |
|---|---|---|
| F16B 37/14 | (2006.01) | |
| F16B 5/06 | (2006.01) | |
| F16B 19/04 | (2006.01) | |
| F16B 19/10 | (2006.01) | |

(52) U.S. Cl.
CPC ............... *F16B 19/04* (2013.01); *F16B 5/0635* (2013.01); *F16B 19/1054* (2013.01)
USPC .......................................... 411/430; 411/112

(58) Field of Classification Search
CPC .......... F16B 19/04; F16B 37/04; F16B 37/14; F16B 37/041; F16B 37/043; F16B 37/044; F16B 37/046; B21K 1/704; B60B 23/06
USPC ......... 411/111, 112, 113, 429, 430, 432, 500, 411/501, 507, 509
See application file for complete search history.

(56) References Cited

U.S. PATENT DOCUMENTS

| | | | | |
|---|---|---|---|---|
| 2,170,739 | A | * | 8/1939 | Tinnerman ...................... 403/21 |
| 2,394,729 | A | * | 2/1946 | Tinnerman .................... 411/112 |
| 2,760,540 | A | * | 8/1956 | Poupitch ....................... 411/112 |
| 3,742,557 | A | * | 7/1973 | Francois ........................ 24/33 B |
| 4,408,939 | A | * | 10/1983 | Graff et al. .................... 411/112 |
| 4,883,397 | A | * | 11/1989 | Dubost .......................... 411/174 |
| 4,897,005 | A | * | 1/1990 | Peterson et al. .............. 411/175 |
| 4,919,580 | A | * | 4/1990 | Wright .......................... 411/173 |
| 5,039,264 | A | * | 8/1991 | Benn ............................. 411/175 |
| 5,624,319 | A | * | 4/1997 | Golczyk et al. ................ 470/21 |
| 5,695,296 | A | * | 12/1997 | Miura ............................... 403/2 |
| 5,713,707 | A | * | 2/1998 | Gagnon ........................ 411/175 |
| 5,893,694 | A | * | 4/1999 | Wilusz et al. ................. 411/112 |
| 6,374,999 | B1 | * | 4/2002 | Winkelman et al. ........ 198/844.2 |
| 6,854,941 | B2 | * | 2/2005 | Csik .............................. 411/112 |
| 2008/0310931 | A1 | * | 12/2008 | Csik et al. .................... 411/103 |

* cited by examiner

*Primary Examiner* — Roberta Delisle
(74) *Attorney, Agent, or Firm* — Michael P. Leary

(57) ABSTRACT

A fastener is fixed to a body panel by inserting a second portion of a clip and the body panel between a flange-shaped head and deformed bulge created by crimping a blind rivet inserted into a mounting hole in the body panel. Afterwards, when a fender panel is inserted between a first portion and the second portion of the clip, pressure is applied to the inserted fender panel from above and below by ribs and on the first and second portions, thereby clamping the fender panel between the first and second portions, and fixing the fastener to the fender panel. The fastener is positioned inside an anti-rotation depression in the body panel.

20 Claims, 13 Drawing Sheets

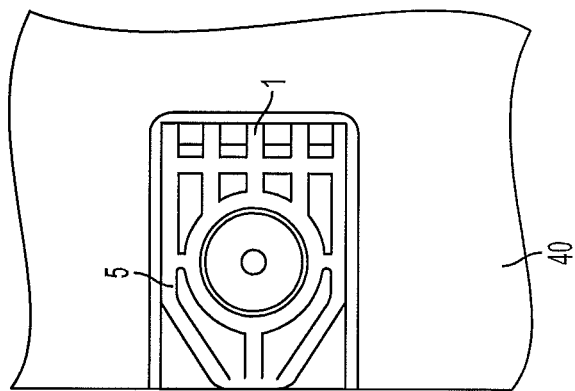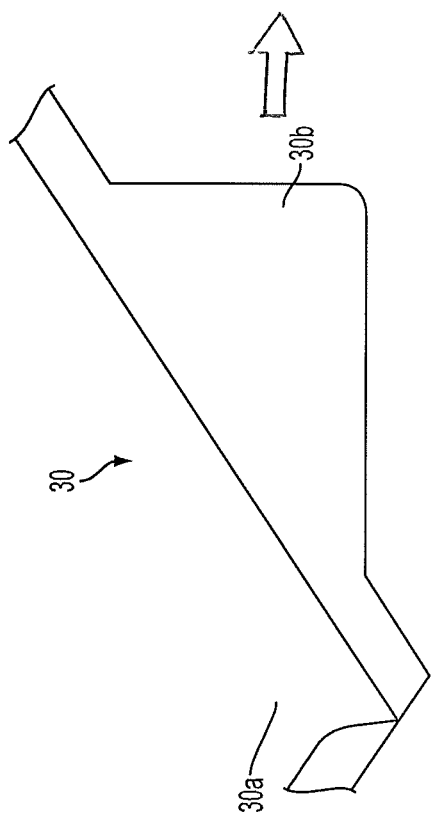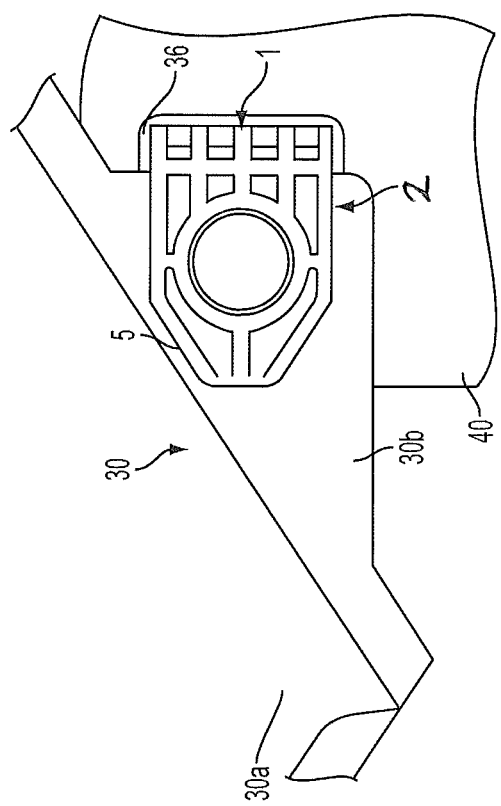

FASTENER

CROSS-REFERENCE TO RELATED APPLICATIONS

This application claims priority from Japanese Patent Application No. 2012-10139, filed on Jan. 20, 2012, the disclosure of which is incorporated herein by reference.

BACKGROUND OF THE INVENTION

The present invention relates to a fastener for mounting a first member such as a fender panel for an automobile to a second member such as a body panel.

A structure for fixing a fender panel to an automobile has been disclosed in Patent Document 1, in which a substantially U-shaped engaging notch is provided in a plate-like lug inside a cutout portion of the fender panel, and the notch engages a deep groove in a fender panel clip mounted on a body panel in order to fix the fender panel to the body panel. The structure for fixing a fender panel to an automobile disclosed in Patent Document 2 is similar to the one disclosed in Patent Document 1.

A bumper side mounting structure has been disclosed in Patent Document 3, in which a clip mounting portion is provided on the rear surface of the bumper side where a fender is joined to the bumper side, and a hole for inserting a screw is provided from below.

A clip is disclosed in Patent Document 4 which has a blind rivet and a rivet body fixed to a body panel via the blind rivet. This is used to fix a rear spoiler to a body panel via a retainer on the rear spoiler.

A fastener is disclosed in Patent Document 5 which has a structure in which legs are inserted into a car body and fixed so that clamps on the legs clamp a component.

PRIOR ART DOCUMENTS

Patent Document 1—Laid-Open Patent Publication No. 2009-298185
Patent Document 2—Laid-Open Patent Publication No. 2005-96502
Patent Document 3—Laid-Open Patent Publication No. 2000-103301
Patent Document 4—Laid-Open Patent Publication No. 9-175444
Patent Document 5—Laid-Open Utility Model Publication No. 62-156612

SUMMARY OF THE INVENTION

These mounting structures and fasteners do not make the mounting operation easy and require metal working, for example, providing a notch in a first member such as a fender panel, in order to engage a fastener. The mounting operation also requires vertical positioning in order to align and insert the fastener into the notch. The object of the present invention is to provide a fastener able to mount a member in another member using a simple mounting operation. More specifically, the object of the present invention is to provide a fastener with a simple mounting operation for mounting structures with difficult portions such as assembling the ends of a panel such as a fender panel in order using bolt fasteners, and for mounting structures that do not require strength but need to prevent panels with seams from popping up.

The present invention provides a fastener for mounting a first member to a second member, characterized in that the fastener has a C-shaped clip for receiving the first member; the clip has a rivet fixed to the second member; the clip has a first portion, a second portion, and a base joining these portions; the clip being configured so the first member is clamped between the first portion and the second portion; a rivet insertion hole is provided in both the first portion and the second portion of the clip for insertion of the rivet; and the clip and the rivet are configured so that the tip of the rivet is passed through the rivet insertion holes in the clip during assembly, and so that the tip is inserted in a mounting hole provided in the second member during mounting, the rivet thereby fixing the second portion of the clip to the second member on the side opposite the side clamping the first member.

In one aspect of the present invention, a rib is provided on the opposing inner sides of both the first and second portions of the clip to contact both faces of the first member and clamp the first member from both sides.

In another aspect of the present invention, a sleeve is provided between the rivet insertion hole of the clip and the outer peripheral face of the rivet. This stabilizes the deformation of the plastic clip and the mounting dimensions when the rivet is fastened.

In another aspect of the present invention, an anti-rotation boss is provided on the side of the second portion of the clip fixed to the second member, the anti-rotation boss being configured so as to be fitted into an anti-rotation mounting hole provided on the second member. This keeps the fastener from rotating with respect to the second member.

In another aspect of the present invention, the shape of the second portion of the clip on the side fixed to the second member is configured so as to conform to the shape of an anti-rotation depression formed in the second member, and the second portion of the clip is fitted into the anti-rotation depression. This keeps the fastener from rotating with respect to the second member.

In another aspect of the present invention, the rivet is a blind rivet comprising a rivet pin having a head and inserted into a rivet tube having a flange-shaped head, the first member is a fender panel for an automobile, and the second member is a body panel for an automobile.

In another aspect of the present invention, the blind rivet is configured so that the second portion of the clip is fixed to the second member during mounting by the flange-shaped head and a deformed bulge created on the back side of the second member by inserting the blind rivet into a mounting hole in the second member and then crimping the blind rivet.

In another aspect of the present invention, the rib provided on the inner side of the second portion of the clip is provided at a predetermined interval from the rivet insertion hole of the second portion so as not to engage the flange-shaped head of the blind rivet during mounting, and the height of the rib is greater than the height of the flange-shaped head. This allows the flange-shaped head to make direct contact with a face on the inner side of the second portion and the rib to make direct contact with a face of the first member.

In the present invention, the fastener has a C-shaped clip for receiving the first member, the clip has a rivet fixed to the second member, the clip has a first portion, a second portion, and a base joining these portions, and the rivet is configured so as to fix the second portion of the clip to the second member on the side opposite the side clamping the first member. As a result, the first member can be easily mounted on the second member by fixing the fastener to the second member beforehand and then accommodating the first member in the C-shaped clip. When a panel such as a fender panel is mounted and the end is inserted into a gap during assembly, it cannot be fixed inside the gap using a bolt. However, when the fastener of the present invention is set inside the gap beforehand and the end of the fender panel is inserted into the gap, the end of the panel can be easily inserted into the C-shaped clip. As a result, the mounting operation is easier, the fender panel is kept from popping up, and the visible seam is cleaner.

BRIEF DESCRIPTION OF THE DRAWINGS

FIG. 6 is a disassembled view of the fastener in FIG. 2, in which

FIG. 12 is a series of drawings showing an application of a fastener according to the first embodiment of the present invention, in which FIG. 12A shows a fender panel, FIG. 12B shows a body panel on which the fastener has already been mounted, and FIG. 12C shows the fender panel in FIG. 12A mounted on the body panel shown in FIG. 12B.

DETAILED DESCRIPTION OF THE PREFERRED EMBODIMENTS

The following is an explanation of embodiments of the present invention with reference to the drawings. FIG. 1 through FIG. 12 show a first embodiment of the present invention, and FIG. 13 through FIG. 21 show a second embodiment of the present invention.

Figure 10:
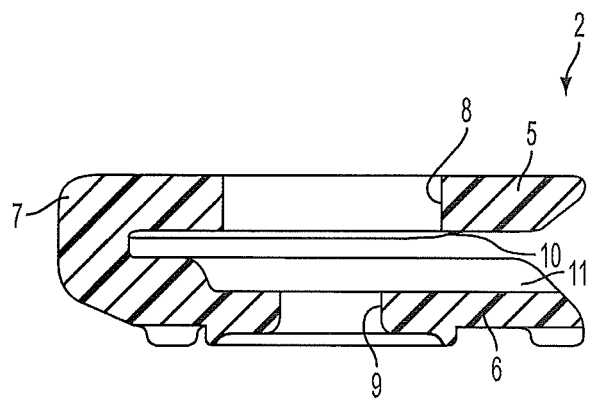
FIG. 10 is a cross-sectional view from arrows A-A in FIG. 8.
Figure 11:
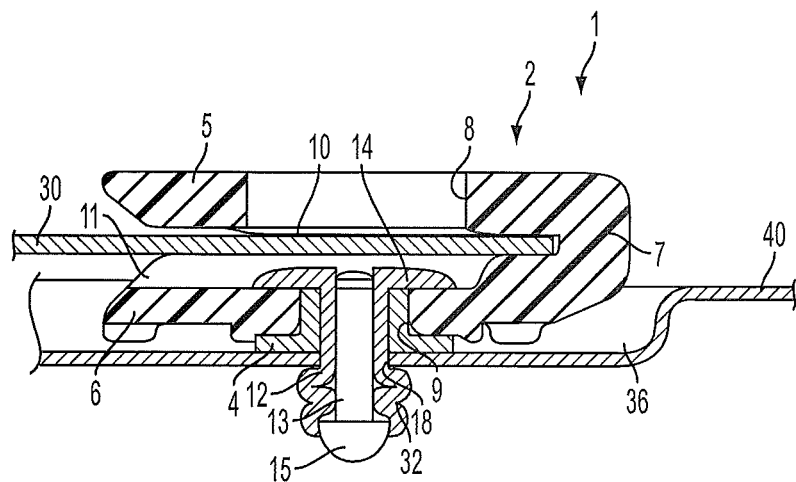
FIG. 11 is a cross-sectional view showing the fastener in FIG. 5 being used.
Figure 13:
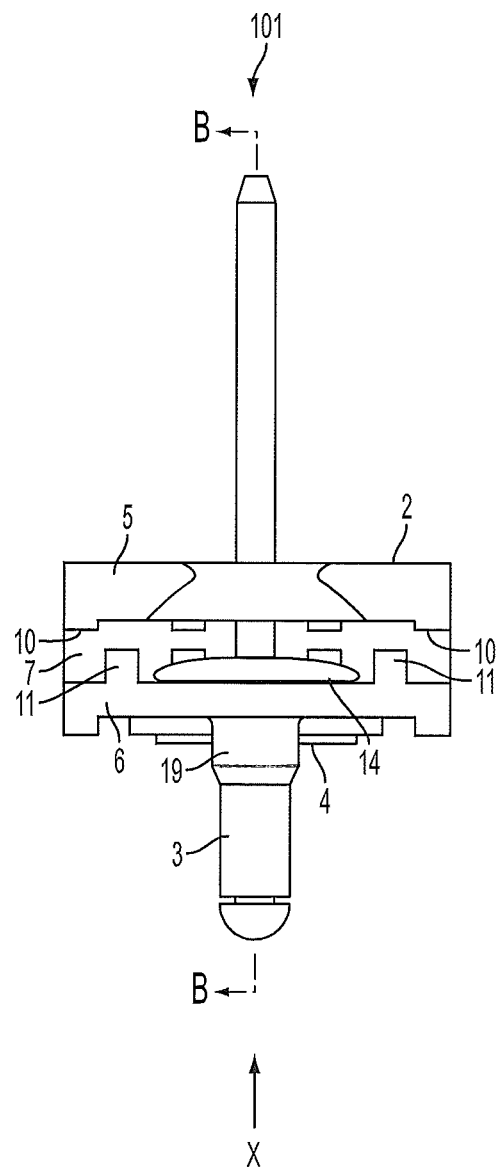
FIG. 13 is a view similar to the one in FIG. 2 showing a fastener according to a second embodiment of the present invention.
Figure 14:
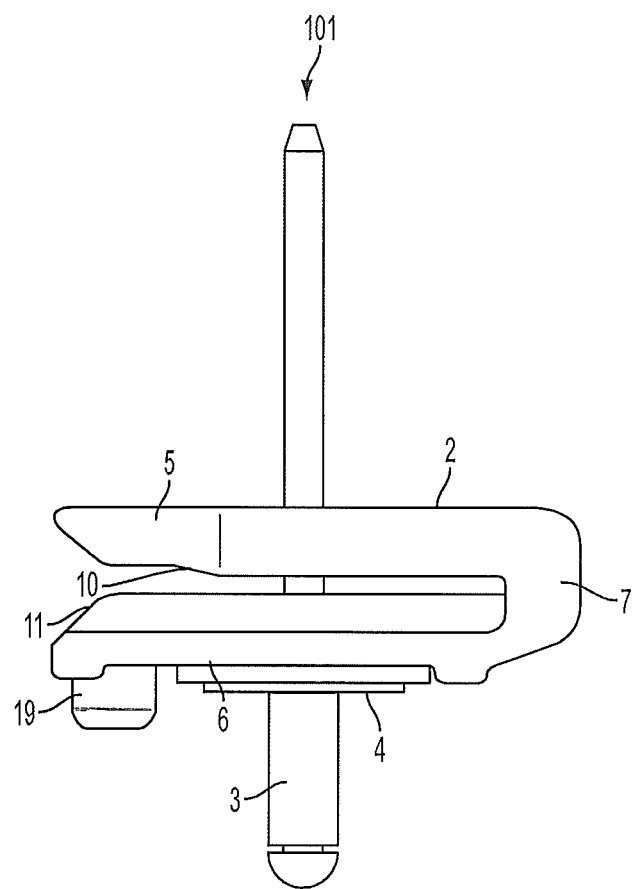
FIG. 14 is a view of FIG. 13 from the right.
Figure 15:
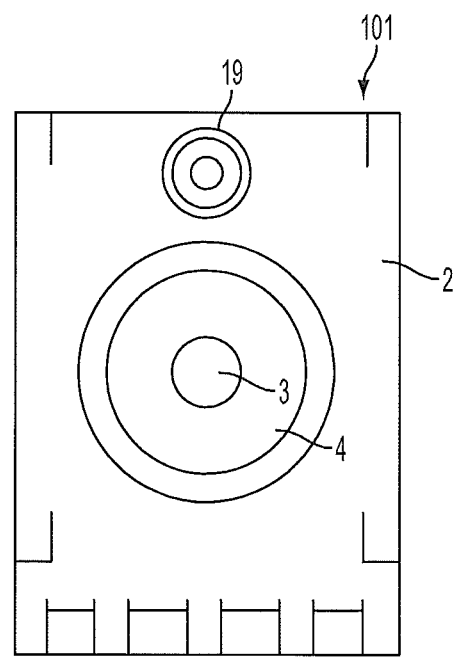
FIG. 15 is a view from below along arrow X in FIG. 13.
Figure 16:
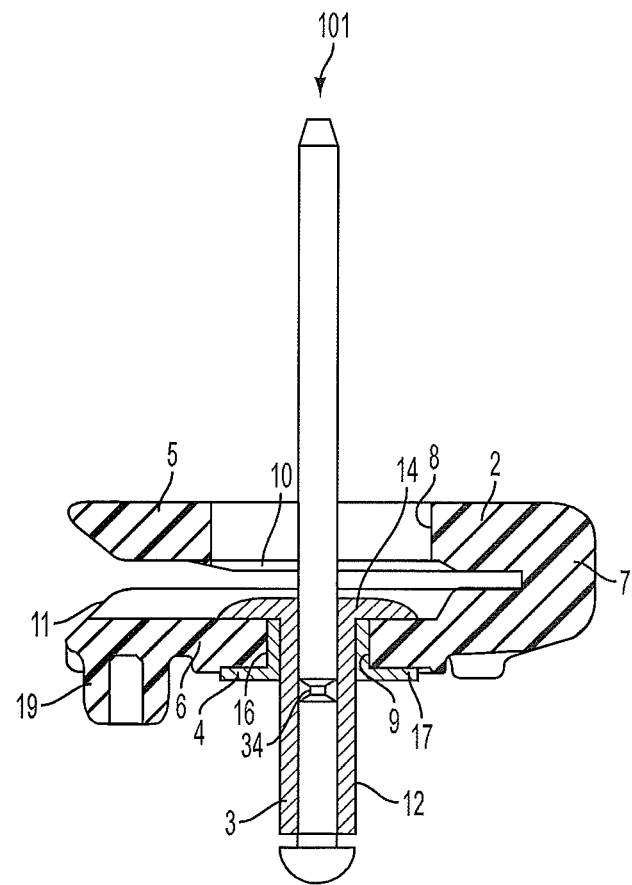
FIG. 16 is a cross-sectional view from arrows B-B in FIG. 13.
Figure 17:
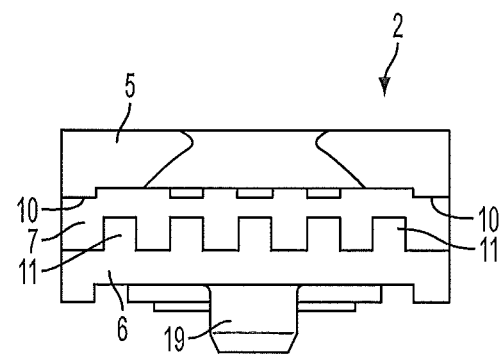
FIG. 17 is a view of the clip for the fastener in FIG. 13.
Figure 18:
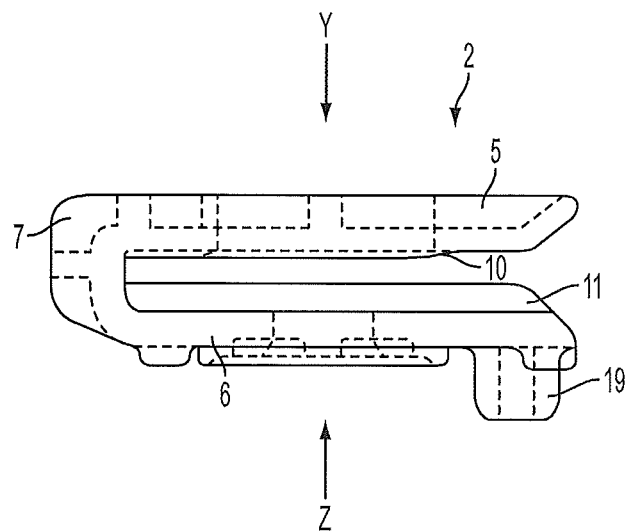
FIG. 18 is a view of FIG. 17 from the left.
Figure 19:
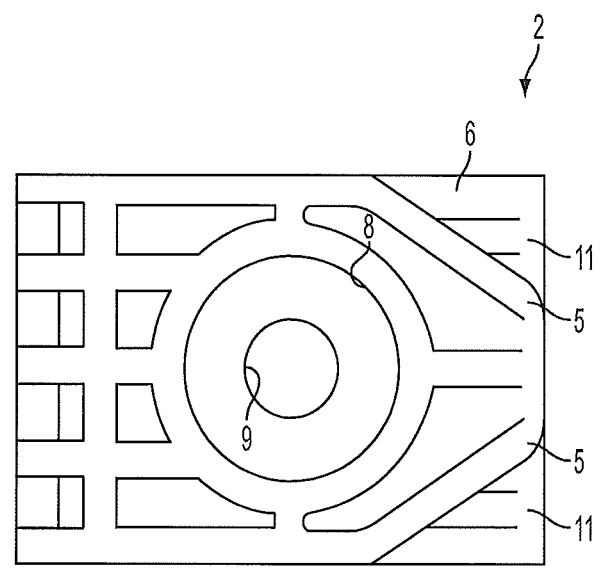
FIG. 19 is a view from above along arrow Y in FIG. 18.
Figure 20:
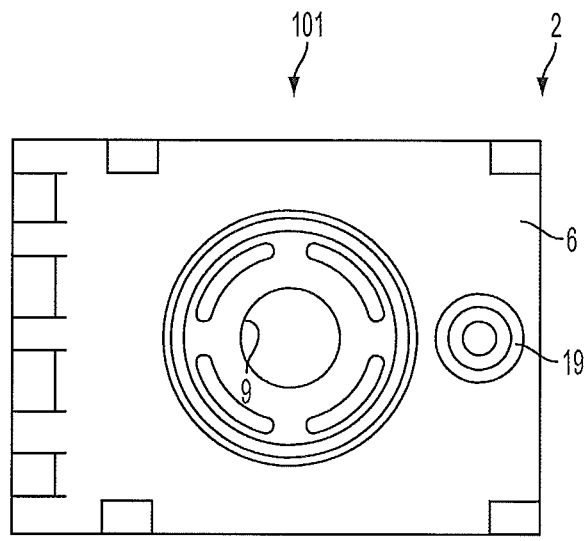
FIG. 20 is a view from below along arrow Z in FIG. 18.

The first embodiment of the present invention will now be explained. FIG. 1 through FIG. 6 show the fastener 1 in the first embodiment of the present invention, and FIG. 7 through FIG. 10 show details of the plastic clip 2, which is a configurational element of the fastener 1. FIG. 11 shows the fastener 1 in use, and FIG. 12 shows an application of the fastener 1 as a fastener used to mount a fender panel on a body panel.

Figure 6A:
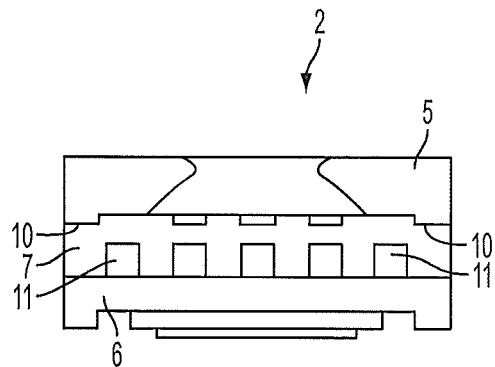
FIG. 6A is the clip.

As shown in FIG. 6, the fastener 1 has a clip 2, a blind rivet 3, and a sleeve 4. The clip 2 has a first portion 5, a second portion 6, and a base 7 joining the two portions. As shown in FIG. 10, the fastener has a C-shaped cross-section. As shown in FIG. 11, when a clip 2 with this configuration is mounted, a first member 30 such as a fender panel is clamped between the first portion 5 and the second portion 6.

Figure 1:
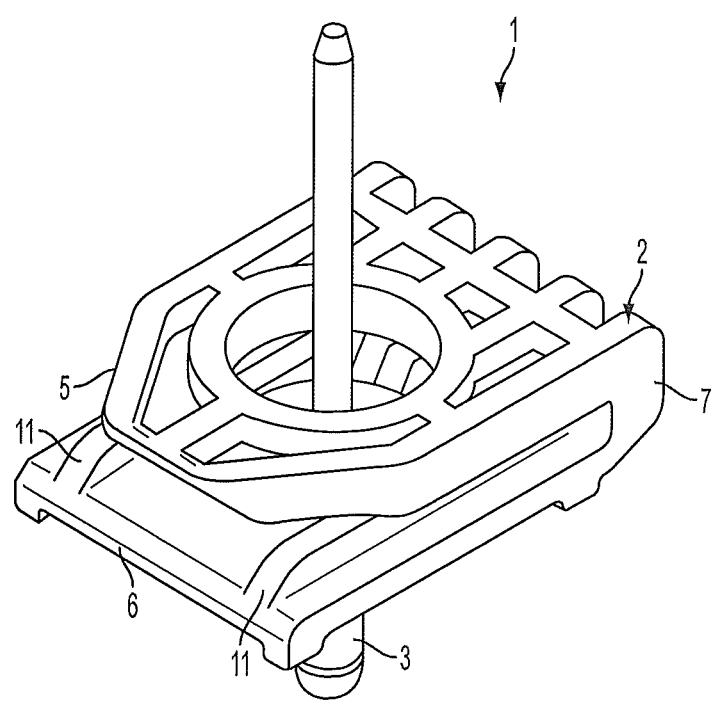
FIG. 1 is a perspective view of the fastener according to the first embodiment of the present invention.
Figure 2:
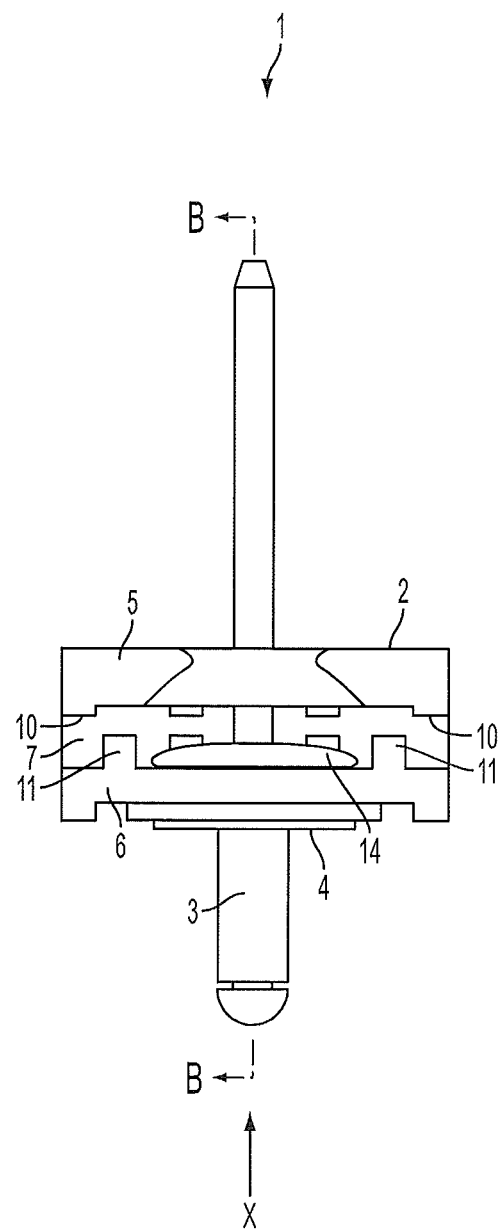
FIG. 2 is a view of the fastener in FIG. 1 from the left.
Figure 3:
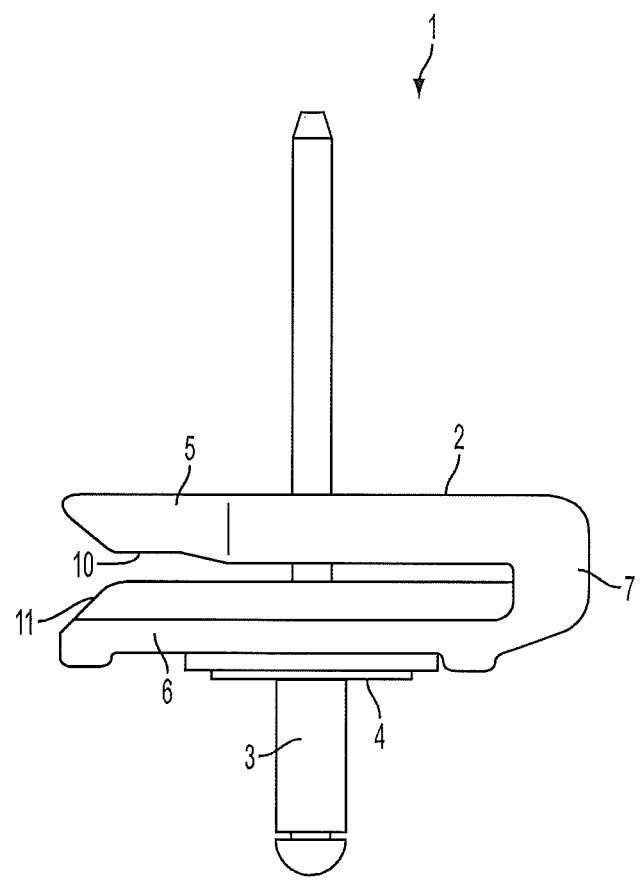
FIG. 3 is a view of the fastener of FIG. 2 from the right.
Figure 4:
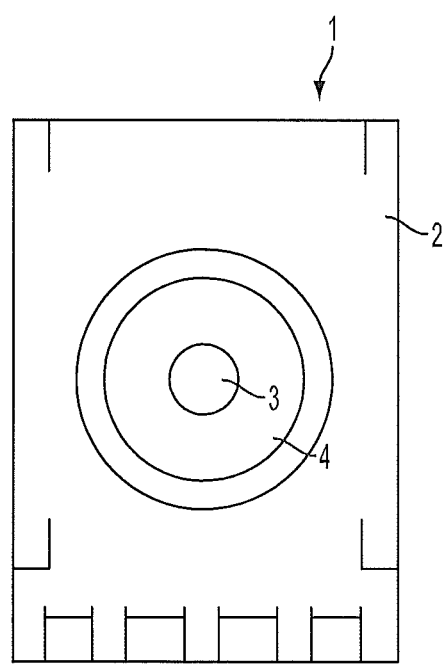
FIG. 4 is a view from below along arrow X in FIG. 2.
Figure 5:
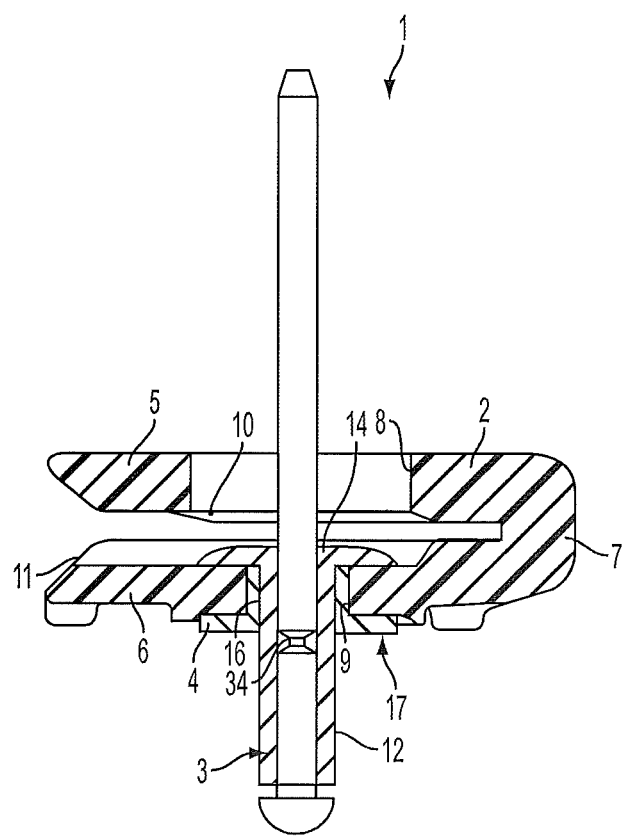
FIG. 5 is a cross-sectional view from arrows B-B in FIG. 2.

As shown in FIG. 10, rivet insertion holes 8, 9 are provided in both the first portion and the second portion of the clip for the insertion of the rivet. As shown in FIG. 5, a blind rivet 3 is inserted into the rivet insertion holes 8, 9. As shown in FIG. 11, ribs 10, 11 are provided on the opposing inner sides of the first portion 5 and the second portion 6 of the clip 2 so as to make contact with both sides of the first member 30 and to clamp the member from both sides.

As shown in FIG. 11, the rib 11 provided on the inner side of the second portion 6 of the clip 2 is positioned at a predetermined interval from the rivet insertion hole 9 in the second portion 6 so as not to engage the flange-shaped head 14 of the blind rivet 3 during mounting. The height of the rib 11 is also greater than the height of the flange-shaped head 14 so that the flange-shaped head 14 makes direct contact with a face on the inner side of the second portion 6 and the rib 11 makes direct contact with a face of the first member 30.

Figure 6B:
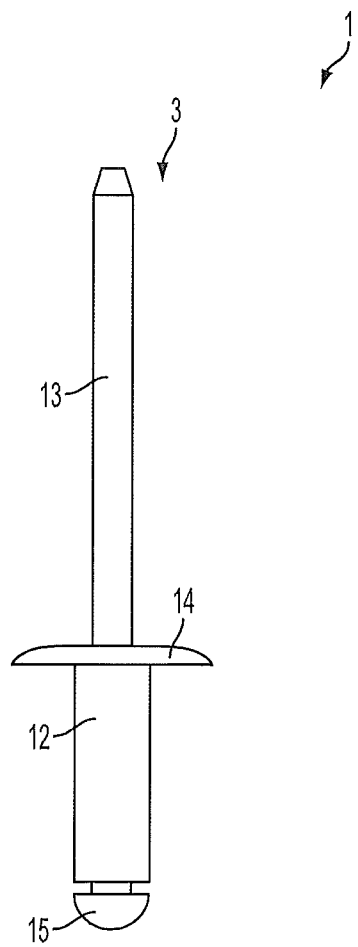
FIG. 6B is the blind rivet.

As shown in FIG. 6B, the blind rivet 3 has a rivet tube 12 and a rivet pin 13 inserted into the rivet tube 12. The rivet tube 12 has a flange-shaped head 14, and the rivet pin 13 has a hemispherical head 15 protruding from the tip of the rivet tube 12. The flange-shaped head 14 of the rivet tube 12, as shown in FIG. 5, makes contact with a face on the inner side of the second portion 6 of the clip 2. The hemispherical head 15 of the rivet pin 13, as shown in FIG. 11, forms a deformed bulge 32 when it is pushed in and crimps the rivet tube 12 during mounting of the fastener 1. At this time, the crimping breaks off the bottom portion of the rivet pin 13 at the breaking portion 34 (FIG. 5) and the broken-off portion is discarded. The rear end portion of the rivet pin 13 remaining in the fastener 1 during mounting does not protrude from the flange-shaped head 14 of the rivet tube 12. Thus, the blind rivet 3 does not engage the first portion 5 during mounting.

During assembly of the clip 2 and the blind rivet 3, the blind rivet 3 is inserted from above in FIG. 5 into the rivet insertion holes 8, 9 in the first portion 5 and the second portion 6 of the clip 2. Thus, as shown in FIG. 5, the outer diameter of the flange-shaped head 14 is smaller than the inner diameter of the rivet insertion hole 8 in the first portion 5, and greater than the inner diameter of the rivet insertion hole 9 in the second portion 6.

Figure 6C:
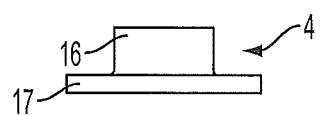
FIG. 6C is the sleeve.
Figure 7:
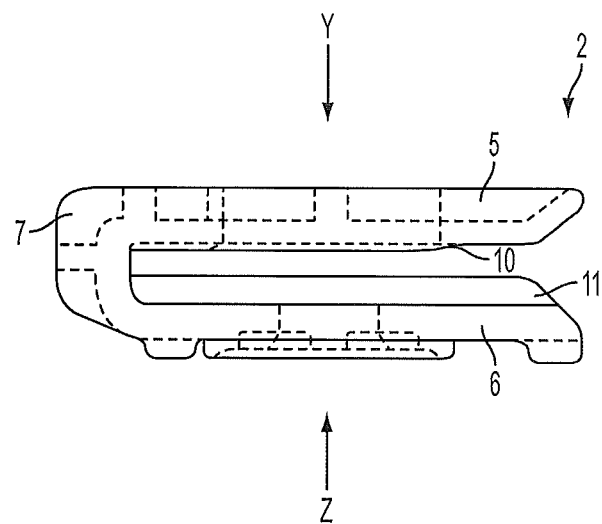
FIG. 7 is a side view from the left of the clip in FIG. 6A.
Figure 8:
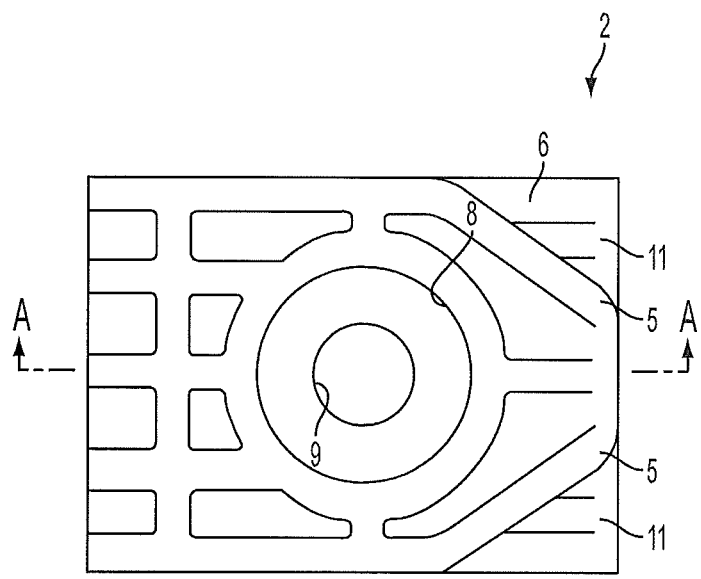
FIG. 8 is a view from above along arrow Y in FIG. 7.
Figure 9:
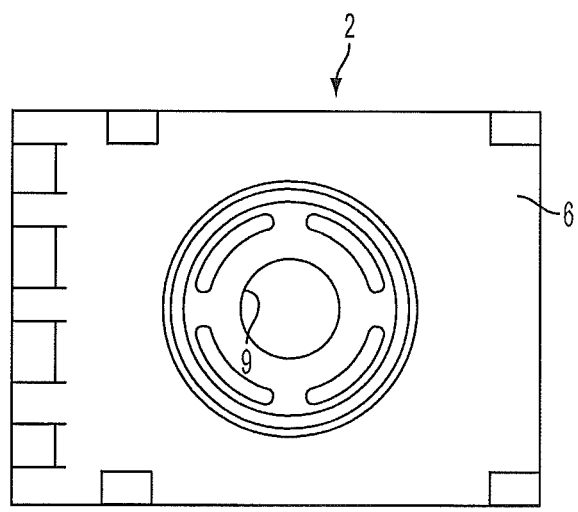
FIG. 9 is a view from below along arrow Z in FIG. 7.

As shown in FIG. 6C, the sleeve 4 has a head 16 and a flange-shaped brim 17. As shown in FIG. 5, the head 16 of the sleeve 4 is fitted between the inner peripheral face of the rivet insertion hole 9 of the second portion 6 of the clip 2 and the outer peripheral surface of the rivet tube 12 of the blind rivet 3. Also, the flange-shaped brim 17 of the sleeve 4 makes contact with a face on the outer side of the second portion 6 of the clip 2. Because the sleeve 4 is used to stabilize the deformation and mounting dimensions of the plastic clip 2 during the fastening of the blind rivet 3, it is preferably a metal sleeve.

FIG. 11 shows the fastener 1 according to the first embodiment of the present invention during use, that is, during mounting. FIG. 12 shows the mounting method used in an application of the fastener 1. In FIG. 11 and FIG. 12, the first member 30 is a fender panel for an automobile, and the second member 40 is a body panel for an automobile.

As shown in FIG. 12B, the fastener 1 is fixed to the second member 40 beforehand. It is fixed by inserting the rivet sleeve 12 of the blind rivet 3 into a mounting hole 18 provided in the second member 40 and then crimping the sleeve. During the crimping, as shown in FIG. 11, a deformed bulge 32 is formed on the underside of the second member 40. This clamps the second portion 6 of the clip 2 and the second member 40 between the deformed bulge 32 and the flange-shaped head 14 of the blind rivet 3, and fixes the fastener 1 to the second member 40.

Afterwards, the first member 30 shown in FIG. 12A is fixed to the fastener 1 shown in FIG. 12B, and the first member 30 is mounted on the second member 40 as shown in FIG. 12C. The first member 30 is fixed to the fastener 1, as shown in FIG. 11, as follows: the flat tip portion of the first member 30 is inserted between the first portion 5 and the second portion 6 of the clip 2. Pressure is applied to the tip portion of the inserted first member from above and below by the ribs 10, 11 on the first portion 5 and the second portion 6, respectively, and this clamps the first member 30 between the first portion 5 and the second portion 6 of the clip 2, and fixes the first member 30 to the fastener 1.

FIG. 12 shows an application for the fastener 1 when a fender panel 30 is mounted on a body panel 40 in the front portion of a triangle-shaped fixed window in a front door of an automobile as described in Patent Document 1. As shown in FIG. 12A, the first member or fender panel 30 has a cutout 30*a* in the fender panel 30 fitted into a sharp corner at the front of the fixed window, and a triangle-shaped plate-like lug 30*b* extends from the cutout 30*a* towards the fixed window. The plate-like lug 30*b* abuts the flat tip portion of the first member inserted between the first portion 5 and the second portion 6 of the clip 2 described above. Thus, as shown in FIG. 12C, the tip portion of the first portion 5 of the clip 2 of the fastener 1 is inclined towards the inside and conforms to the shape of the edge portion of the cutout 30*a* of the fender panel 30.

As shown in FIG. 11 and FIG. 12, an anti-rotation depression 36 is formed in the surface of the second member 40. The shape of the anti-rotation depression 36 conforms to the shape of the second portion 6 of the clip 2 of the fastener 1. As shown in FIG. 11, the second portion 6 of the clip 2 is positioned inside the anti-rotation depression 36 in order to keep the fastener 1 from rotating with respect to the second member 40.

Figure 21:
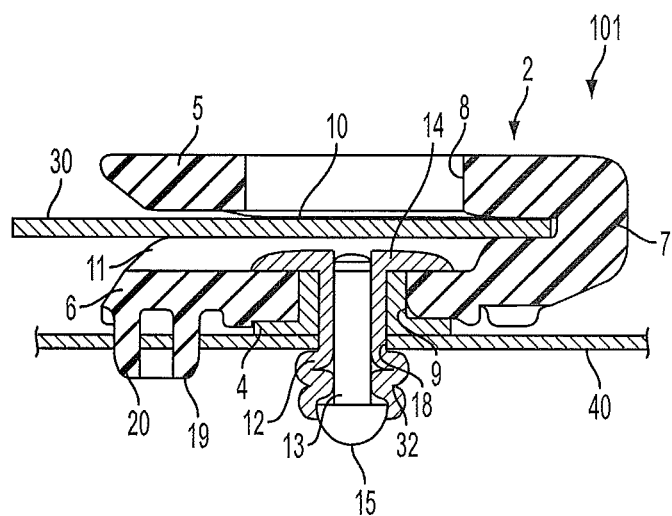
FIG. 21 is a cross-sectional view showing the fastener in FIG. 16 being used.

A second embodiment of the present invention will now be explained. FIG. 13 through FIG. 16 show a fastener 101 according to the second embodiment of the present invention, and FIG. 17 through FIG. 20 show the clip 2 which is a configurational element of the fastener 101. FIG. 21 shows the fastener 101 in use.

The fastener 101 according to the second embodiment has the same configuration as the fastener 1 according to the first embodiment, except that the anti-rotation configuration is different. Thus, the configuration elements identical to those in the fastener 1 according to the first embodiment are denoted by the same reference numbers. In the fastener 101 according to the second embodiment of the present invention, as shown in FIGS. 14 through 21, an anti-rotation boss 19 is provided on the bottom face of the second portion of the clip 2. Also, an anti-rotation mounting hole 20 is provided on the second member 40 to accommodate the anti-rotation boss 19. As shown in FIG. 21, the fastener 101 is kept from rotating with respect to the second member 40 by inserting the anti-rotation boss 19 into the anti-rotation mounting hole 20.

What is claimed is:

1. A fastener for mounting a first member, defining two opposite faces, to a second member, defining a mounting hole, the fastener comprising:
    a C-shaped clip for receiving the first member;
    a rivet including a tip and an outer peripheral face and the rivet being fixable to the second member at the mounting hole;
    a sleeve disposed between the rivet insertion hole of the clip and the outer peripheral face of the rivet;
    the clip further having a first portion, a second portion having two sides, and a base joining the first and second portions, the clip being configured so that the first member is clampable between the first portion and the second portion;
    the first portion and the second portion of the clip defining respective rivet insertion holes for insertion of the rivet; and
    the clip and the rivet being configured so that the tip of the rivet can be passed through the rivet insertion holes in the clip during assembly, and so that the rivet tip can be inserted in the mounting hole in the second member during mounting.

2. The fastener claimed in claim 1, wherein:
    the first and second portions of the clip defining opposing inner sides; and wherein
    each of the opposing inner sides of the first and second portions of the clip includes a rib.

3. The fastener claimed in claim 2, wherein:
    the rivet is a blind rivet including a rivet pin having a first head and a rivet tube having a flange.

4. The fastener claimed in claim 3, wherein the blind rivet is configured so that the second portion of the clip is fixed to the second member by the flange and a deformed bulge created on the side of the second member opposite the side of the second portion clamping the first member, by inserting the blind rivet into the mounting hole in the second member and then crimping the blind rivet.

5. The fastener claimed in claim 1, further comprising:
    an anti-rotation boss disposed on the side of the second portion of the clip fixable to the second member, the anti-rotation boss being configured so as to be fittable into an anti-rotation mounting hole in the second member.

6. The fastener claimed in claim 5, wherein:
    the rivet is a blind rivet including a rivet pin having a first head and a rivet tube having a flange.

7. The fastener claimed in claim 6, wherein the blind rivet is configured so that the second portion of the clip is fixed to the second member by the flange and a deformed bulge created on the side of the second member opposite the side of the second portion clamping the first member, by inserting the blind rivet into the mounting hole in the second member and then crimping the blind rivet.

8. The fastener claimed in claim 1, wherein:
    the second portion of the clip on a side fixable to the second member includes an anti-rotation boss configured so as to conform to an anti-rotation depression fanned in the second member.

9. The fastener claimed in claim 8, wherein:
    the rivet is a blind rivet including a rivet pin having a first head and a rivet tube having a flange.

10. The fastener claimed in claim 9, wherein the blind rivet is configured so that the second portion of the clip is fixed to the second member by the flange and a deformed bulge created on the side of the second member opposite the side of the second portion clamping the first member, by inserting the blind rivet into the mounting hole in the second member and then crimping the blind rivet.

11. The fastener claimed in claim 1, wherein:
    the rivet is a blind rivet including a rivet pin having a first head and a rivet tube having a flange.

12. The fastener claimed in claim 11, wherein the blind rivet is configured so that the second portion of the clip is fixed to the second member by the flange and a deformed bulge created on the side of the second member opposite the side of the second portion clamping the first member, by inserting the blind rivet into a mounting hole in the second member and then crimping the blind rivet.

13. The fastener claimed in claim 12, wherein the rib provided on the inner side of the second portion of the clip is provided at a predetermined interval from the rivet insertion hole of the second portion so as not to engage the flange of the blind rivet during mounting, the height of the rib being greater than the height of the flange, thereby allowing the flange-shaped to make direct contact with a face on the inner side of the second portion and the rib to make direct contact with a face of the first member.

14. An assembly comprising:
a first member, defining two opposite faces;
a second member, defining a mounting hole; and
a fastener further comprising:
  a C-shaped clip including a first portion, a second portion having two sides, and a base joining the first and second portions, the first portion and the second portion of the clip defining respective first and second rivet insertion holes;
  a sleeve located in the second rivet insertion hole;
  a rivet including a tip and an outer peripheral face, the rivet located coaxially in within the sleeve; and
wherein:
  the first member is clamped between the first portion and the second portion of the clip;
  the rivet is fixed to the second member in the mounting hole; and
  the rivet fixes the second portion of the clip to the second member on the side of the second portion opposite the side of the second portion clamping against the first member.

15. The assembly according to claim 14, wherein the first portion and the second portions of the clip define respectively a first inner side having a first rib and, opposite to the first inner side, a second inner side having a second rib, and the first rib and the second rib contact respective faces of the first member, thereby clamping the first member from both sides.

16. The assembly according to claim 14, wherein:
the second member defines an anti-rotation depression; and
the second portion of the clip on the side fixed to the second member includes an anti-rotation boss fitted into the anti-rotation depression.

17. The assembly according to claim 14, wherein:
the rivet is a blind rivet including a rivet pin having a first head and a rivet tube having a flange; and
the first member is a fender panel for an automobile; and the second member is a body panel for an automobile.

18. The assembly according to claim 17, wherein the second portion of the clip and the second member are clamped between the rivet flange and a dammed bulge in the rivet tube.

19. A fastener for mounting a first member, defining two opposite faces, to a second member, defining a mounting hole, the fastener comprising:
a C-shaped clip including a first portion, a second portion, and a base joining the first and second portions, the first portion and the second portion of the clip defining respective and coaxial first and second rivet insertion holes;
a sleeve located in the second rivet insertion hole;
a blind rivet including a stem with a head and a body with a flange; and
wherein the rivet is located coaxially within the sleeve such that the sleeve surrounds a portion of the rivet body, the flange is located on an interior side of the second portion, and the head projects axially beyond an exterior side of the second portion.

20. The fastener according to claim 19, wherein:
the first portion of the clip includes a first inner rib;
the second portion of the clip includes a second inner rib; and
wherein the second inner rib defines a rib height, and the rivet flange defines a flange height less than the rib height.

* * * * *